United States Patent [19]
Rudd

[11] Patent Number: 5,689,551
[45] Date of Patent: Nov. 18, 1997

[54] CALLER ID SYSTEM WITH PRESCALER

[75] Inventor: Clarence Charles Rudd, Oswego, N.Y.

[73] Assignee: Thomson Consumer Electronics, Inc., Indianapolis, Ind.

[21] Appl. No.: 544,085

[22] Filed: Oct. 17, 1995

[51] Int. Cl.$^6$ .................................................. H04M 1/57
[52] U.S. Cl. ..................... 379/142; 379/395; 379/398; 379/400
[58] Field of Search ........................... 379/142, 395, 379/340, 347, 348, 346, 398, 400, 401, 414, 399

[56] References Cited

U.S. PATENT DOCUMENTS

| | | | |
|---|---|---|---|
| 3,727,003 | 4/1973 | Paraskevakos | 379/142 X |
| 3,787,626 | 1/1974 | Subieta | 379/142 |
| 3,812,296 | 5/1974 | Paraskevakos | 379/373 X |
| 4,405,833 | 9/1983 | Cave et al. | 379/418 X |
| 4,414,432 | 11/1983 | Skerlos et al. | 379/390 X |
| 4,582,956 | 4/1986 | Doughty | 379/142 X |
| 4,747,065 | 5/1988 | West | 364/715.1 |
| 5,146,490 | 9/1992 | Beckman | 379/113 |
| 5,177,734 | 1/1993 | Cummiskey et al. | 370/32.1 |
| 5,263,092 | 11/1993 | Jang | 381/104 |
| 5,289,529 | 2/1994 | Karnowski | 379/395 X |
| 5,315,650 | 5/1994 | Smith et al. | 379/142 X |
| 5,341,411 | 8/1994 | Hashimoto | 379/142 X |
| 5,422,950 | 6/1995 | Miller et al. | 379/340 X |
| 5,506,885 | 4/1996 | Hamilton | 379/347 X |

OTHER PUBLICATIONS

Lancaster, Don; "Keying & VCA Circuits, Part 2", Popular Electronics, Feb. 1975, pp. 37–39.

Primary Examiner—Krista M. Zele
Assistant Examiner—Devendra T. Kumar
Attorney, Agent, or Firm—Joseph S. Tripoli; Peter M. Emanuel; Robert D. Shedd

[57] ABSTRACT

A caller ID system is disclosed in which a prescaler is coupled between a source of a caller ID signal and a caller ID receiver, and a processor is coupled to the caller ID receiver. The prescaler is responsive to the processor for scaling the caller ID signal.

17 Claims, 2 Drawing Sheets

CALLER ID SYSTEM WITH PRESCALER

FIELD OF THE INVENTION

The present invention relates to a caller ID system including a processor which controls the scale factor of a prescaler coupled between the caller ID signal source and the caller ID receiver.

BACKGROUND OF THE INVENTION

In areas providing the service, information indicating which phone number is making a call, called caller ID information, is inserted on the telephone line between the first and second rings of a phone call. The specification for the signal carrying this information was published by BELLCORE. This specification included the signal levels for the caller ID signal. More specifically, the absolute level of the caller ID signal transmitted from the central office was specified to be −13 dBm. A worst case loss on the telephone line from the central office to the telephone receiver is specified as 14 dB, with another 3 db loss due to the tip and ring interface circuit which is coupled between the telephone line and the caller ID receiver. Thus, a caller ID receiver having a sensitivity of around −32 dBm and a dynamic range of around 20 dB would have sufficient margins to properly process a caller ID signal according to the specification. Such receivers have been designed and built, and are on the market at a relatively low cost.

However, it has been found that the caller ID signal levels which are present on actual telephone lines deviate from those in the specification. For example, some subscriber line interface circuits (SLICs) and call concentrators operate passively and introduce up to a 10 dB additional loss. In addition, every extra caller ID receiver added in parallel to a phone line introduces an additional loss of from 4 to 6 dB. On the other hand, some SLICs and call concentrators operate in an active manner as repeaters, and amplify the received signal, some providing a higher level signal than that produced at the central office. This combined with the lack of a long line between the SLIC or call concentrator and the telephone receiver means a higher signal level is present in telephone receivers coupled to such SLICs and call concentrators. Signal levels have been observed in actual telephone lines of from +6 dBm to −47 dBm.

When a signal which may have such a widely varying signal level is supplied to a caller ID receiver designed to operate on a signal according to the signal specification, as described above, that receiver may not operate properly in all cases. If the telephone line to which the receiver is attached has a signal which is stronger than that specified, i.e. from +6 dBm to −13 dBm, the receiver circuitry becomes overloaded and does not operate properly. If the telephone line to which the receiver is attached has a signal which is weaker than that specified, i.e. from −32 dBm to −47 dBm, the caller ID signal cannot be detected. In either case, the caller ID receiver does not operate properly, even though that same receiver will operate properly on a telephone line having a signal within the specified limits.

To operate properly on signals which can vary in this manner with sufficient margins, a caller ID receiver would require a sensitivity of around −50 dBm and a dynamic range of around 60 dB. A caller ID receiver operating in this manner is a very expensive part, and drives the consumer cost of a telephone including this receiver very high. An arrangement which can permit the use of a caller ID receiver designed according to the specified signal levels, which is a relatively low cost part, in a signal environment described above, with a widely varying range of signal levels, without requiring expensive circuitry is very desirable.

In accordance with principles of the present invention, a prescaler is coupled between a source of a caller ID signal and a caller ID receiver, and a processor is coupled to the caller ID receiver. The prescaler is responsive to the processor for scaling the caller ID signal.

DESCRIPTION OF THE PREFERRED EMBODIMENTS

Figure 1:
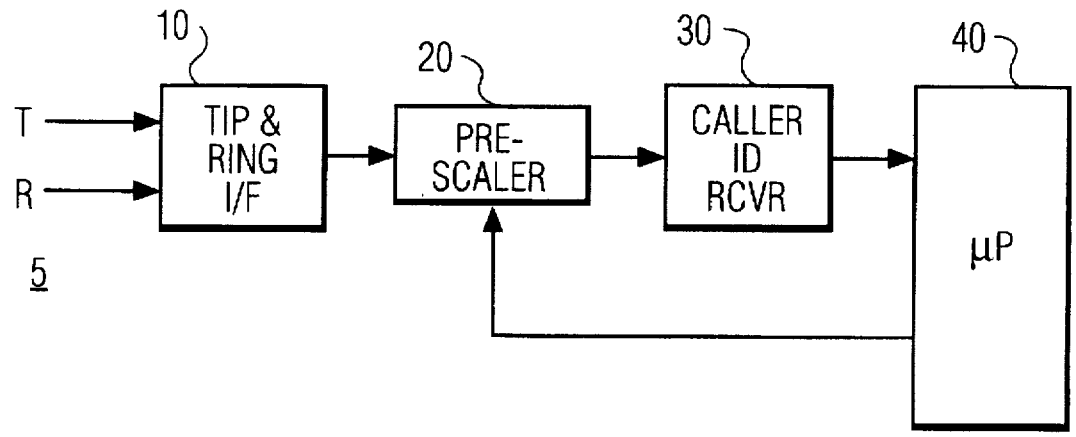
FIG. 1 is a block diagram of a caller ID system in a telephone receiver according to the present invention.

FIG. 1 is a block diagram of a caller ID system in a telephone receiver according to the present invention. In FIG. 1, an input terminal 5 is coupled to a source of a telephone signal such as a central office, a SLIC or a call concentrator (not shown). The input terminal 5 includes a tip line input terminal T and a ring line input terminal R in a known manner. The signal received at the input terminal 5 contains a caller ID signal which is inserted between the first and second rings when a call is received at the telephone receiver including the caller ID system illustrated in FIG. 1.

The tip T and ring R signals at the input terminal 5 are coupled to respective input terminals of a tip and ring signal interface 10. An output terminal of the tip and ring signal interface 10 is coupled to a signal input terminal of a prescaler 20. A signal output terminal of the prescaler 20 is coupled to an input terminal of a caller ID receiver 30. The caller ID receiver 30 may be constructed to operate on a caller ID signal according to the published specification, and need not handle a caller ID signal having the extended range of levels, described above, occurring on actual telephone lines. Thus, the caller ID receiver 30 may be a relatively inexpensive part. An output terminal of the caller ID receiver 30 is coupled to an input terminal of a microprocessor (μP) 40. An output terminal of the μP 40 is coupled to a control input terminal of the prescaler 20.

In operation, when a phone call signal is received over the tip T and ring R lines, the tip and ring signal interface 10 receives and pre-processes those signals, and passes a signal representing the phone call signal to the caller ID receiver 30 via the prescaler 20 (whose operation will be described in more detail below), in a known manner. The caller ID receiver 30 detects the caller ID signal between the first and second rings, and extracts the caller ID information, also in a known manner. The caller ID information is passed to the μP 40, which then processes that information, in a known manner. For example, the μP 40 may supply the calling phone number to a display device (not shown) where the owner of the telephone receiver may see it before answering the telephone. Alternatively, the μP 40 may access prestored information about the caller from a mass storage unit (not shown) coupled to the μP 40 and display that information on a monitor (not shown) also coupled to the μP 40 so the owner of the telephone receiver may see pertinent information on the monitor screen before answering the telephone call.

The prescaler 20 provides a fixed gain or attenuation to the signal passing from its signal input terminal to its signal output terminal. The amount of gain or attenuation, called a scale factor, is determined by the signal at its control input terminal. This signal is supplied by the µP 40 in a manner to be described in more detail below. If the scale factor is one, then no gain or attenuation is introduced into the signal, and the signal is passed unchanged from the signal input to the signal output terminal. In this case, the system of FIG. 1 operates in the same manner as prior art caller ID systems. If the scale factor is less than one, then some degree of attenuation is introduced into the signal passed from the signal input to the signal output terminals; and if the scale factor is greater than one, then some degree of amplification is introduced into the signal passed from the signal input to the signal output terminals. The prescaler 20 is used in this manner to scale the level of the received signal to lie somewhere within the dynamic range of the caller ID receiver either by amplifying a signal weaker than the specified minimum level signal or attenuating a signal stronger than the specified maximum level signal.

Figure 2:
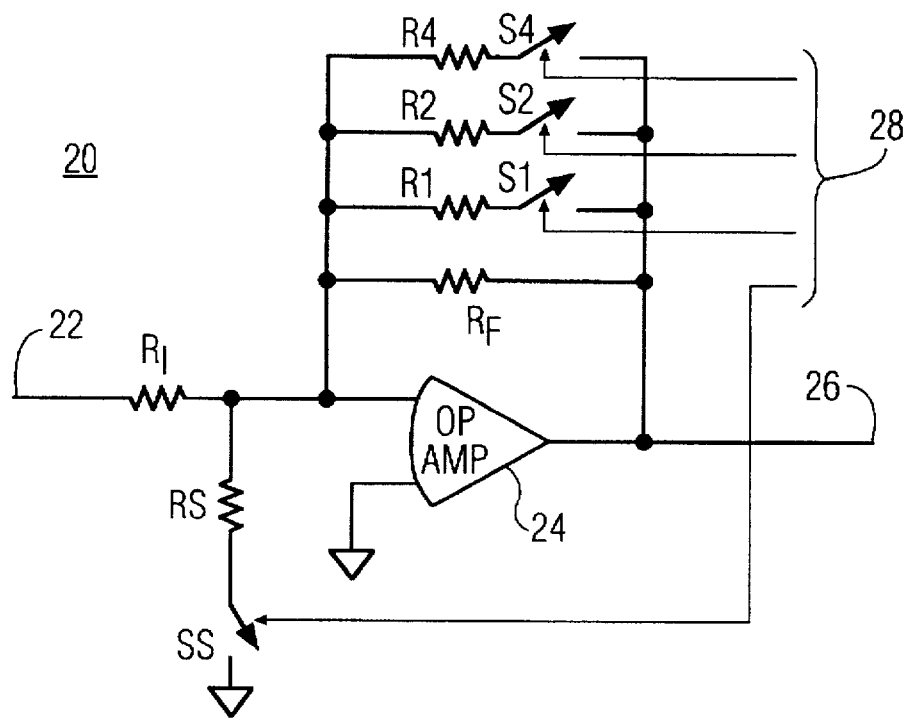
FIG. 2 is a schematic diagram of a prescaler which may be used in the caller ID system illustrated in FIG. 1.

FIG. 2 is a schematic diagram of an examplary prescaler 20 which may be used in the caller ID system illustrated in FIG. 1. In FIG. 2, the signal input terminal 22 of the prescaler 20 is coupled to a first input terminal of an operational amplifier (op amp) 24 via an input resistor $R_I$. A second input terminal of the op amp 24 is coupled to a source of reference potential (ground). An output terminal of the op amp 24 is coupled to the signal output terminal 26 of the prescaler 20. A feedback resistor $R_F$ is coupled between the output terminal and the first input terminal of the op amp 24. A serial connection of a switch S1 and a resistor R1, a serial connection of a switch S2 and a resistor R2, and a serial connection of a switch S4 and a resistor R4 are all coupled in parallel with the feedback resistor $R_F$. A serial connection of a switch SS and a shunt resistor RS is coupled between the first input terminal of the op amp 24 and ground.

The switches S1, S2, S4, and SS may be known controllable analog switches, such as are found on an MC41066 integrated circuit package manufactured by Motorola Corporation. Each of the switches S1, S2, S4 and SS includes a control input terminal which controls whether that switch is open or closed in a known manner. A control input terminal 28 includes respective control signal lines coupled to the corresponding control input terminals of the switches S1, S2, S4 and SS. The switches S1, S2, S4 and SS are controlled by respective digital control signals received at the control input terminal 28 from corresponding output terminals of the µP 40 (of FIG. 1). One skilled in the art of µP design will understand how to connect the control input terminals of the switches S1, S2, S4, and SS to the corresponding output terminals of the µP, and will understand how to program the µP to control the signals generated by these output terminals. For example, the four control input terminals may be connected to four binary output terminals which are included in the µP, or to a four bit output port attached to a system bus coupled to the µP.

The prescaler 20 illustrated in FIG. 2 operates in a known manner as an amplifier. The gain of the amplifier is the ratio of the resistance in the feedback path to the resistance in the input path. For example, assuming that all switches are open, the gain G is:

$$G = R_F/R_I$$

As switches S1 through S4 are closed, either individually or in any combination, in response to digital signals from the µP 40, the resistance in the feedback path decreases, and the gain of the amplifier decreases. In addition, when the switch SS is closed, the shunt resistor RS acts to decrease the input voltage at the input of the op amp 24, and acts as an attenuator. Thus, the minimum gain condition, which may be adjusted to be an attenuation, occurs when all of switches S1, S2, S4 and SS are closed, and the maximum gain condition occurs when they are all open.

The values of resistors R1 through R4 and RS may be specified in a known manner to provide fixed scale factor increments when the switches S1 through S4 and SS are closed in different combinations in response to their respective control signals from the µP 40. In FIG. 2, three switched resistors are illustrated in the feedback path and one in the input path. This provides sixteen different scale factor settings. One skilled in that art of operational amplifier circuit design will understand that any number of switched resistors may be included in either the feedback path or the input path to provide any desired number of scale factor settings. The scale factor steps are selected so that at least one combination of open and closed switches S1 through S4 and SS will result in a gain or attenuation which will place the signal at output terminal 26 within the dynamic range of the caller ID receiver 30 (of FIG. 1).

For example, if the caller ID receiver 30 (of FIG. 1) has a dynamic range of 20 dB, the resistors R1 through R4 and RS may be selected so that scale factor increments are ½ of the dynamic range, i.e. around 10 dB. With such an arrangement at least one scale factor setting will lie within the 20 dB dynamic range of the caller ID receiver 30 (of FIG. 1). The sixteen gain settings with increments of 10 dB between each results in a total dynamic range of 150 dB, which is sufficient to properly prescale signals running from +6 dBm to −47 dBm to within the dynamic range of the caller ID receiver 30.

Alternatively, the resistors R1 through R4 and RS may be selected so that the gain increments are ⅓ of the dynamic range of the caller ID receiver 30, i.e. around 7 dB. With such an arrangement, at least two settings will lie within the dynamic range of the caller ID receiver 30. Sixteen gain settings with increments of 7 dB between each results in a total dynamic range of 105 dB, which is, again, sufficient to properly prescale signals in the range found on actual telephone lines to within the dynamic range of the caller ID receiver 30.

As described above, FIG. 2 illustrates an exemplary arrangement for a prescaler 20. One skilled in the art of analog circuit design will understand that other circuit arrangements can generate the same function of providing a switchable scale factor, which can be either a gain or attenuation, to an input signal. For example, a series connection of a plurality of controllable transistor amplifiers, each of which provides a fixed gain or attenuation, may be switched into or out of the signal path to scale the input signal by the desired scale factor.

Figure 3:
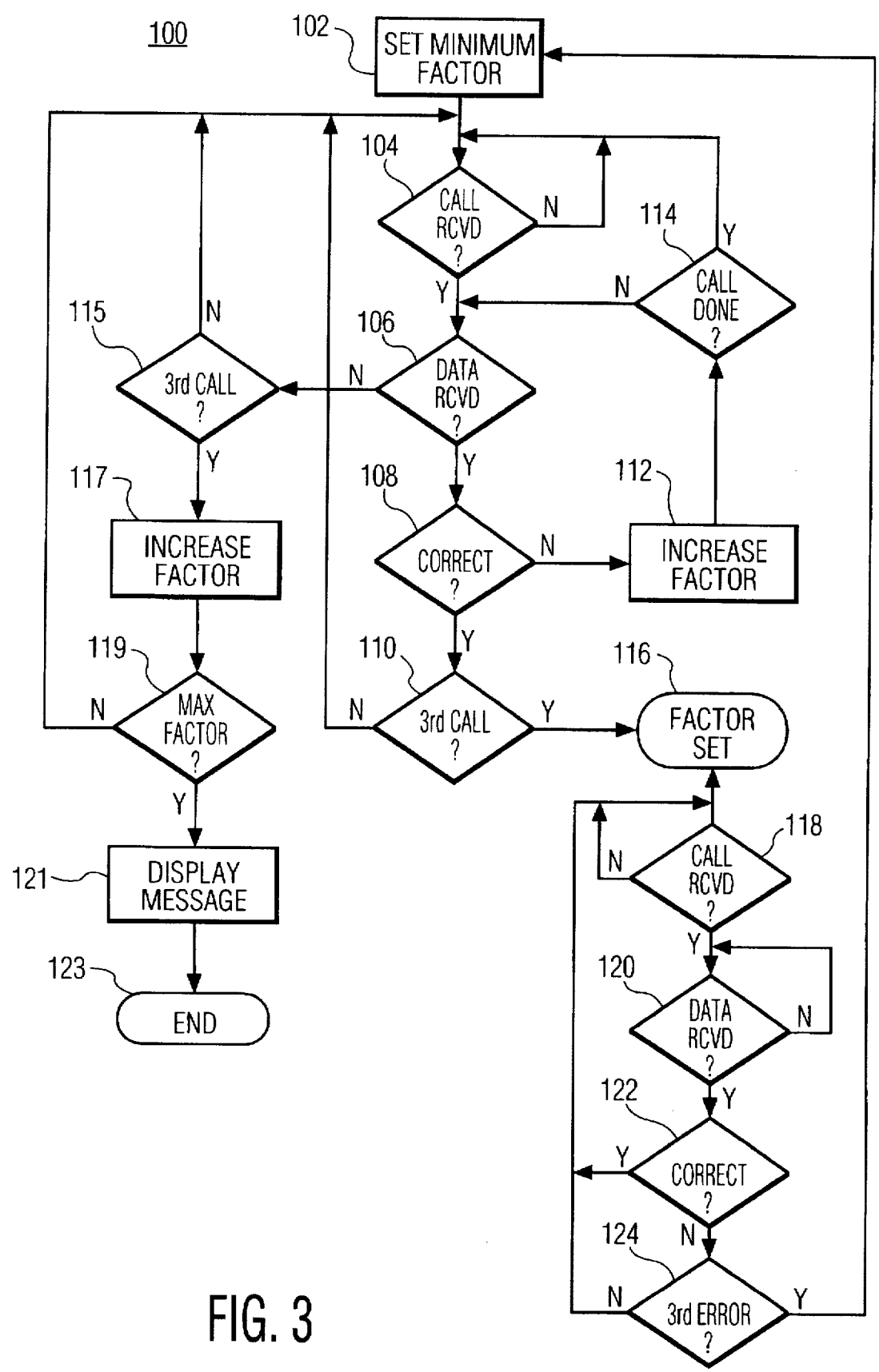
FIG. 3 is a flow diagram illustrating the method for adjusting the scale factor of the prescaler illustrated in FIG. 2.

FIG. 3 is a flow diagram illustrating a method 100 for adjusting the scale factor of the prescaler 20 illustrated in FIG. 2. The method 100 is performed by the µP 40 (of FIG. 1). In FIG. 3, the upper portion performs the adjustment of the scale factor of the prescaler 20, and the lower right hand portion monitors the operation of the caller ID system to ensure that the scale factor remains properly adjusted.

When a call is received at a telephone receiver from a central office, the caller ID information is inserted between the first and second rings. This information is repeated several times within that interval, and is encoded with an error detection code so that incorrect data may be detected. The caller ID receiver 30 extracts the caller ID data and supplies it to the µP 40 for further processing, in a known manner. The µP 40 checks the error detecting code to determine if the caller ID information was received correctly and if so, further processes that data in a known manner as described above. In the present invention, the µ40 simultaneously controls the scale factor of the prescaler 20.

In step 102, the scale factor of the prescaler 20 is adjusted to its minimum gain, which in the illustrated embodiment is an attenuation factor. In step 104, the µP 40 waits until a call is received, by continually looping to step 104 until a call is received. When a call is received, step 106 is entered. In step 106, the µP 40 waits until caller ID information is transmitted from the central office by continually looping to step 106 until caller ID data is detected. If no caller ID information is detected, then step 115 is entered.

If no caller ID information has been detected for three successive telephone calls, then it is assumed that the level of the caller ID signal is so low that it cannot be detected by the caller ID receiver 30 (of FIG. 1). Step 115 determines whether three successive telephone calls have passed with no caller ID information detected. This number of telephone calls may be changed. If not, then step 104 is reentered, in which the next telephone call is waited for. If so, then, in step 117, the scale factor is increased. In step 119, the value of the scale factor is tested to determine if it is the maximum scale factor. If it is, then, in step 121, a message is displayed on the output display (not shown) asking the user if the telephone line to which the telephone receiver is attached has the caller ID function activated. Then the scale factor adjustment process is ended in step 123. Other steps (not shown) are taken depending upon the response of the user to the displayed message.

Referring again to step 106, when caller ID data has been detected and received, step 108 is entered. In step 108, the error detecting code appended to the caller ID data is checked to determine whether it was correctly received. If the caller ID information was not correctly received, then it is assumed that the caller ID signal level is too low, and the scale factor is increased in step 112. After the scale factor is increased, a check is made to determine whether the call is completed. If not then step 106 is reentered to check the other instances of the caller ID information inserted on the telephone signal. If the call is completed, then no further instances of caller ID information will be transmitted, and the µP 40 waits until the next phone call is received to further adjust the scale factor of the prescaler 20 by reentering step 104.

If the caller ID information was correctly received in step 108, then a check is made in step 110 to determine how many calls have been received with correct caller ID information. The first scale factor adjustment resulting in correct caller ID information may adjust the scale factor so that the signal level is at one edge of the dynamic range of the caller ID receiver. Therefore, the scale factor is adjusted for three consecutive calls in the method illustrated in FIG. 3. The number of calls may be increased or decreased. After three calls with correct caller ID information being received, it is assumed that the scale factor has been appropriately adjusted, and step 116 is entered in which no further adjustments will be made, except as described below.

In steps 118, 120 and 122, similar steps are performed as in steps 104, 106 and 108 described above. When a call is received (step 118), the caller ID information is received (step 120) and the error detecting code appended to the caller ID data is checked to determine if the caller ID information has been correctly received (step 122). So long as the caller ID information is correctly received, step 122 returns to step 118. If, however, an error occurs, step 124 is entered.

Because changes in the level of the caller ID signal are generally the result of changes of equipment in the telephone line between the central office and the telephone receiver containing the caller ID system illustrated in FIG. 1, adjustments in the scale factor are only rarely necessary. When an error occurs in the caller ID information, it is most likely a chance occurrence caused, perhaps, by a noisy line, or one-time interference from a telephone line physically adjacent the telephone line coupled to the illustrated caller ID system.

Therefore, in step 124, a count is made of the number of consecutive telephone calls in which an error in the caller ID information occurred. When the third consecutive telephone call resulting in incorrect caller ID information is received, it is assumed that some change in the telephone line coupled between the central office and the telephone receiver has occurred, and the scale factor is readjusted from scratch by reentering step 102. Otherwise, it assumed that the error was a chance occurrence and no change is made to the scale factor by reentering step 118.

A system according to the present invention provides for the correct receipt of caller ID information from caller ID signal levels having the relatively wide range of levels occurring in actual telephone lines using a relatively low-cost caller ID receiver which operates with the relatively narrower dynamic range set forth in the published standard and a prescaler coupled between the tip and ring interface circuit and the caller ID receiver. The prescaler is controlled by a microprocessor, which would have been included in the telephone receiver anyway to process the caller ID information, thus adding no cost to the caller ID receiver. The prescaler may be constructed from an operational amplifier, and a small number of switched resistors in the feedback and/or input paths of the operational amplifier. This is also a relatively inexpensive circuit, and the combination of the illustrated prescaler and the caller ID receiver is much less expensive than a caller ID receiver redesigned to have the high sensitivity and wide dynamic range required for actual telephone lines.

What is claimed is:

1. A caller ID system, comprising:
   a caller ID receiver coupled to an input for receiving an input signal including a caller ID signal;
   a processor coupled to the caller ID receiver for detecting an error in said caller ID signal; and
   a prescaler, coupled between said input and the caller ID receiver, for scaling said input signal in response to said processor detecting said error in said caller ID signal.

2. The system of claim 1, wherein the prescaler is capable of scaling the caller ID signal by either amplifying or attenuating the caller ID signal.

3. The caller ID system of claim 1 wherein said error comprises no caller ID information being detected in said input signal.

4. The caller ID system of claim 1 wherein said error comprises incorrect data being included in said caller ID signal.

5. The system of claim 1, wherein the prescaler comprises:
   an operational amplifier; and
   a plurality of switched resistors coupled between an output terminal and an input terminal of the operational amplifier.

6. The system of claim 5 wherein each of the switched resistors comprises a series connection of a resistor and a switch.

7. The system of claim 6 wherein each switch is a controlled switch which opens and closes in response to a signal from the processor.

8. The system of claim 5 wherein the prescaler further comprises a plurality of switched resistors coupled to the input terminal of the operational amplifier.

9. The system of claim 8 wherein each of the switched resistors comprises a series connection of a resistor and a switch.

10. The system of claim 9 wherein each switch is a controlled switch which opens and closes in response to a signal from the processor.

11. In a system for receiving caller ID information associated with respective sequential telephone calls, including a prescaler for scaling a caller ID signal by a scale factor, a method for controlling the scale factor, comprising the steps of:

adjusting the scale factor until caller ID information has been correctly received for a first predetermined number of consecutive telephone calls;

maintaining the scale factor until caller ID information has been incorrectly received for a second predetermined number of consecutive telephone calls; and repeating the adjusting step.

12. The method of claim 11 wherein the step of adjusting the scale factor is preceded by the steps of:

receiving caller ID information; and determining if received caller ID information is correct.

13. The method of claim 11, wherein the adjusting step comprises the steps of:

setting the scale factor to a minimum scale factor;

receiving caller ID information;

determining if received caller ID information is correct; and if the received caller ID information is not correct, increasing the scale factor and repeating the receiving step.

14. The method of claim 13 wherein the adjusting step further comprises, before the receiving step, the steps of:

detecting the presence of caller ID information; and if no caller ID information is detected, increasing the scale factor and repeating the adjustment step.

15. The method of claim 14 wherein the adjusting step further comprises, after the step of increasing the scale factor after no caller ID information is detected, the steps of:

determining if the scale factor is at a maximum level; and if the scale factor is at a maximum level, halting the reception of caller ID information.

16. The method of claim 13 wherein the adjusting step further comprises, before the receiving step, the steps of:

detecting the presence of caller ID information; and if no caller ID information is detected for a third predetermined number of telephone calls, increasing the scale factor and repeating the adjustment step.

17. The method of claim 16 wherein the adjusting step further comprises, after the step of increasing the scale factor after no caller ID information is detected, the steps of:

determining if the scale factor is at a maximum level; and if the scale factor is at a maximum level, displaying a message for a user and halting the reception of caller ID information.

* * * * *